United States Patent
Kadoriku et al.

[11] Patent Number: 5,868,978
[45] Date of Patent: Feb. 9, 1999

[54] INJECTION MOLDING METHOD FOR THIN COMPONENTS

[75] Inventors: Shinji Kadoriku, Takarazuka; Yoshio Maruyama, Kyoto; Takaaki Higashida, Kadoma; Hiroshi Yutani, Katano; Keizo Matsumura, Hirakata, all of Japan

[73] Assignee: Matsushita Electric Industrial Co., Ltd., Osaka, Japan

[21] Appl. No.: 950,949

[22] Filed: Oct. 15, 1997

[30] Foreign Application Priority Data

Nov. 21, 1996 [JP] Japan .................................. 8-310856

[51] Int. Cl.⁶ .................................................. B29C 45/43
[52] U.S. Cl. ..................... 264/40.5; 264/328.1; 264/335; 425/150; 425/556; 425/437; 425/810
[58] Field of Search ............................... 264/40.5, 328.1, 264/335; 425/150, 556, 437, 810, DIG. 102; 249/66.1

[56] References Cited

U.S. PATENT DOCUMENTS

| | | | |
|---|---|---|---|
| 3,952,991 | 4/1976 | Schneider | 425/DIG. 102 |
| 4,772,196 | 9/1988 | Asai | 425/810 |
| 4,802,834 | 2/1989 | Neko | 264/40.5 |
| 4,961,884 | 10/1990 | Watanabe et al. | 425/810 |
| 5,018,962 | 5/1991 | Kitamura et al. | 425/810 |
| 5,171,585 | 12/1992 | Onisawa et al. | 425/810 |
| 5,316,466 | 5/1994 | Tanaka et al. | 425/810 |
| 5,330,693 | 7/1994 | Takada | 425/810 |
| 5,545,365 | 8/1996 | Asai | 425/810 |
| 5,626,890 | 5/1997 | Asai | 425/810 |
| 5,693,348 | 12/1997 | Sakamoto et al. | 425/810 |
| 5,720,994 | 2/1998 | Asai | 425/810 |

*Primary Examiner*—Jill L. Heitbrink
*Attorney, Agent, or Firm*—Jordan and Hamburg

[57] ABSTRACT

The separation of a lower mold from an upper mold in an injection molding machine is either temporarily paused or carried out at a lower speed so as to maintain deformation of a thin component within a permissible range, while a jet of air is applied to help remove the thin component from the upper mold. Also, the ejecting operation of the thin component is either temporarily paused or carried out at a lower speed before the deformation of the thin component exceeds the permissible limit while a jet of air is applied to help remove the thin component from the lower mold.

8 Claims, 8 Drawing Sheets

Fig. 3A
POSITION OF MOLD 4

Fig. 3B
SPEED OF MOLD 4

Fig. 3C
AIR BLOW FROM AIR SUPPLYING MEANS 21

Fig. 3D
SEPARATION OF SUBSTRATE FROM MOLD 2

*Fig. 5A*
POSITION OF
MOLD 4

*Fig. 5B*
SPEED OF
MOLD 4

*Fig. 5C*
AIR BLOW FROM
AIR SUPPLYING
MEANS 22

*Fig. 5D*
SEPARATION OF
SUBSTRATE FROM
MOLD 4

Fig. 6A
POSITION OF MOLD 4

Fig. 6B
SPEED OF MOLD 4

Fig. 6C
AIR BLOW FROM AIR SUPPLYING MEANS 22

Fig. 6D
SEPARATION OF SUBSTRATE FROM MOLD 4

INJECTION MOLDING METHOD FOR THIN COMPONENTS

BACKGROUND OF THE INVENTION

The present invention relates to a method and an apparatus for injection molding of various thin components, such as optical disk substrates and magnetic recording mediums, which are made of synthetic resin and have relatively wide flat surfaces.

Figure 7A:
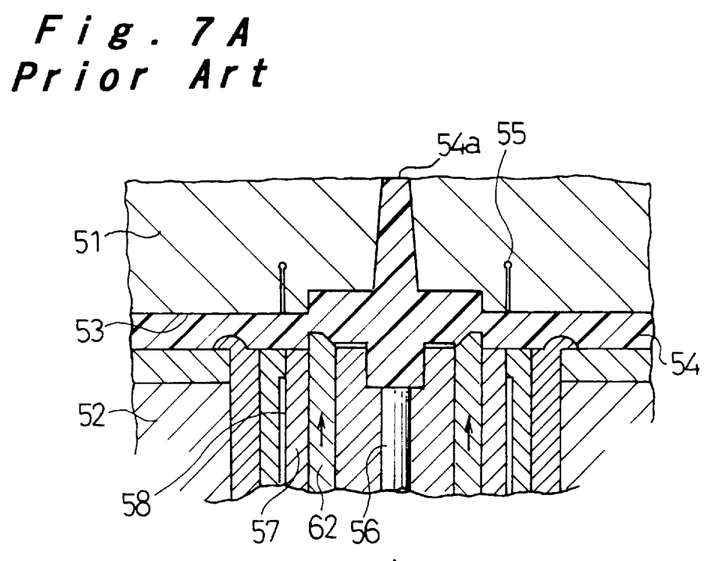
FIGS. 7A and 7B are cross-sectional views of a conventional injection molding apparatus, respectively showing a state in which the ejecting operation of a sprue portion has started, and a state in which the sprue portion has been completely separated.
Figure 7B:
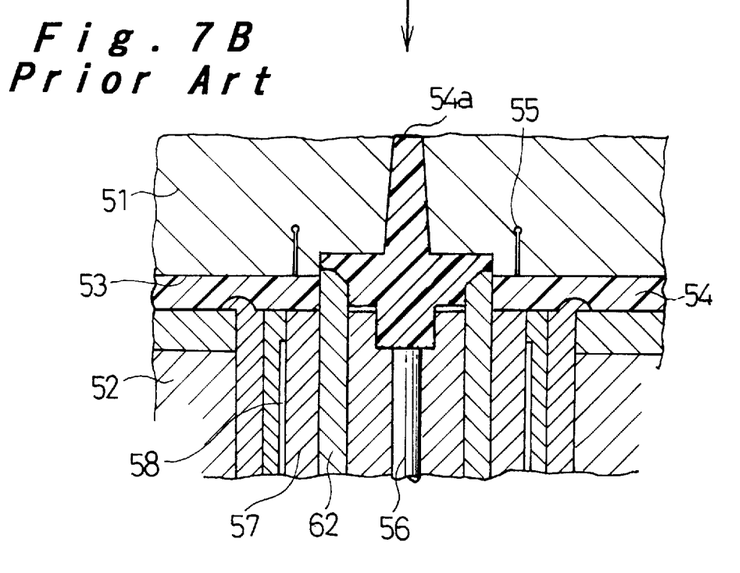

In a conventional injection molding machine as shown in FIGS. 7A and 7B, optical disk substrates are formed in a cavity 53 between two molds 51 and 52 at a stationary plate side and at a movable plate side, respectively. In a curing process of a resin material during the molding operation, a sprue portion 54a is separated from the optical disk substrate 54 by lifting up a gate cut punch 62 mounted at the center of the movable plate from a position shown in FIG. 7A to a position shown in FIG. 7B. The two molds are then opened after the optical disk substrate 54 is cooled down and cured by releasing heat to the molds. Generally, in order to minimize the duration required for the molding cycle, a jet of air is applied from slots 55 in the mold to the interface between the optical disk substrate 54 and the mold 51 while the molds are being opened at a high speed so as to swiftly cool down and separate the optical disk substrate 54 from the mold 51 at the stationary plate side.

Figure 8A:
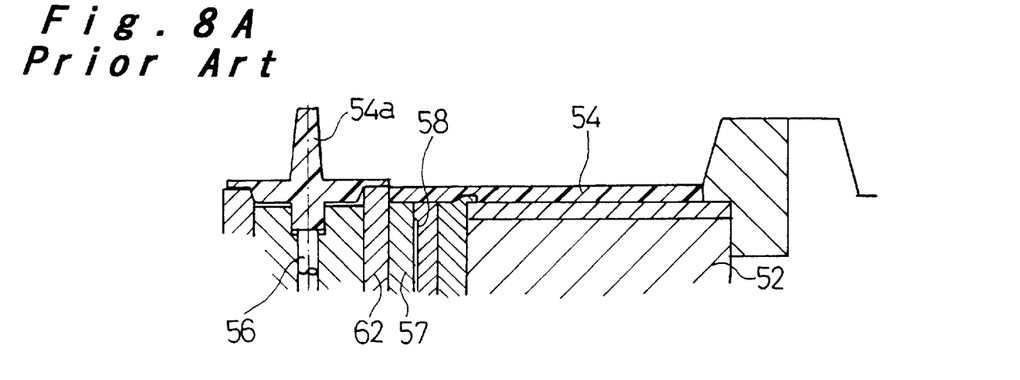
FIGS. 8A–8C are cross-sectional views showing the changes in the state of the conventional injection molding apparatus after the ejecting operation is started, respectively showing a state in which the mold separation has been started, a state of an early stage of the ejecting operation, and a state of the optical disk substrate being removed by an upward thrust at its central portion.
Figure 8B:
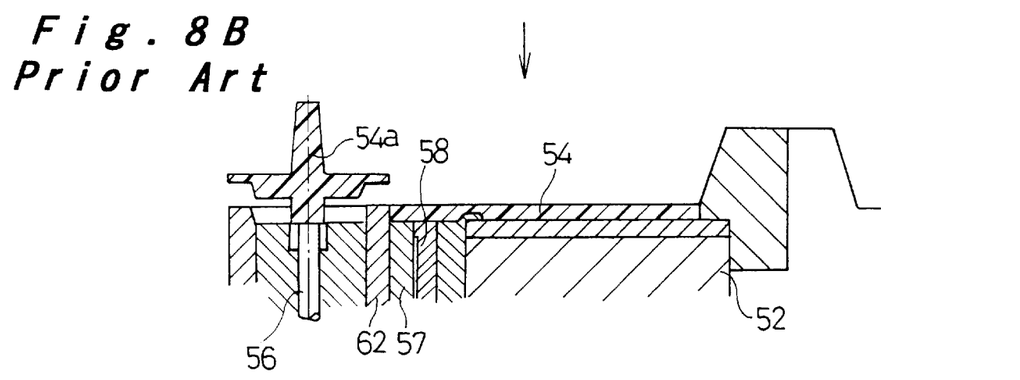
Figure 8C:
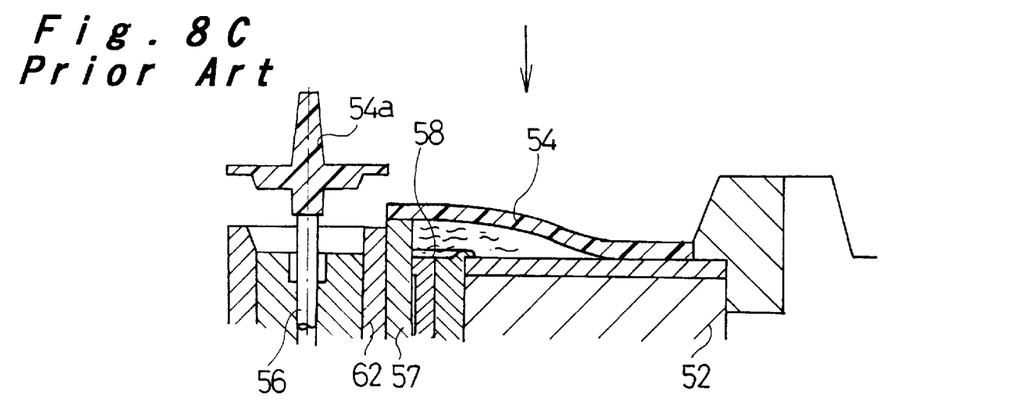

After the separation of the two molds, the optical disk substrate 54 and the sprue portion 54a are ejected out by an eject rod (not shown), which is mounted at the center of the movable plate, lifting up in a sequence a sprue eject rod 56 and a substrate eject rod 57, both being joined to the mold 52, as shown in FIGS. 8A–8C, while a stream of air is applied from slots 58 in the mold 52 to the other side of the optical disk substrate 54 to ease the removal of the optical disk substrate 54 from the mold 52.

After the completion of the ejecting operation, the optical disk substrate 54 and the sprue portion 54a are transferred from the injection molding machine to the outside by a pickup device (not shown).

There is a demand for further reduction of the molding cycle. In order to achieve this object, it is essential to minimize the time for cooling. The cooling time at the time of separating the molds is, however, substantially short, and further reduction of the time may lead to undercooling of the substrates. If the temperature during the separation of the molds and the ejection of the optical disk substrate 54 becomes higher than a thermoforming temperature of the resin material, the resistance generated when the optical disk substrate 54 is separated from the molds 51 and 52 or the moment generated between the center and the rim of the optical disk substrate 54 when its central part is lifted up while the rim is not fully separated from the mold may cause a deflection or bend in the optical disk substrate 54 as shown in FIG. 8C.

BRIEF SUMMARY OF THE INVENTION

It is an object of the present invention to minimize the duration of time for the cycle of molding thin components by accelerating the cooling and the separating operations at the time of opening the molds with an intensive jet of air, without exceeding a permissive level of deformation in the thin components.

To accomplish the object, the present invention is characterized in that, in an injection molding process of thin components, such as optical disk substrates, when upper and lower molds are opened after a thin component is formed in a cavity between the molds, a jet of air is applied from the upper mold side to an interface between an upper surface of the component and the upper mold at a stationary plate, while the mold separating operation is temporarily paused at a position where the amount of deformation of the component reaches a permissive limit, and restarted after the entire surface of the component is removed from the upper plate by the air jet.

According to such arrangement, the deformation of the thin components over the permissive limit is restricted by the amount of separation of two molds, while the thin component can be more quickly removed from the lower mold at the stationary plate side by an intensive jet of air for a shorter time. Also, as the component can be cooled down faster with the help of the air jet, the deformation of the component is further prevented. Apart from the period during which the mold separating action is paused, the operation is carried out at a high speed, thus reducing the time for the molding cycle without presenting problems of deflection or bend of the thin components.

Other and further objects, features and advantages of the invention will appear more fully from the following description.

BRIEF DESCRIPTION OF THE DRAWINGS

FIGS. 3A–3C are time charts showing the changes in the state of the injection molding machine of FIG. 1 before the ejecting operation is started, in which

FIGS. 4A–4C are time charts showing the changes in the state of the injection molding machine of FIG. 1 before the ejecting operation is started according to a modified embodiment, in which

FIGS. 5A–5C are time charts showing the changes in the state of the injection molding machine of FIG. 1 after the ejecting operation is started, in which

FIGS. 6A–6C are time charts showing the changes in the state of the injection molding machine of FIG. 1 after the ejecting operation is started according to a modified embodiment, in which

DETAILED DESCRIPTION OF THE INVENTION

Preferred embodiments of the present invention will be hereinafter described referring to FIGS. 1 to 6.

Figure 1:
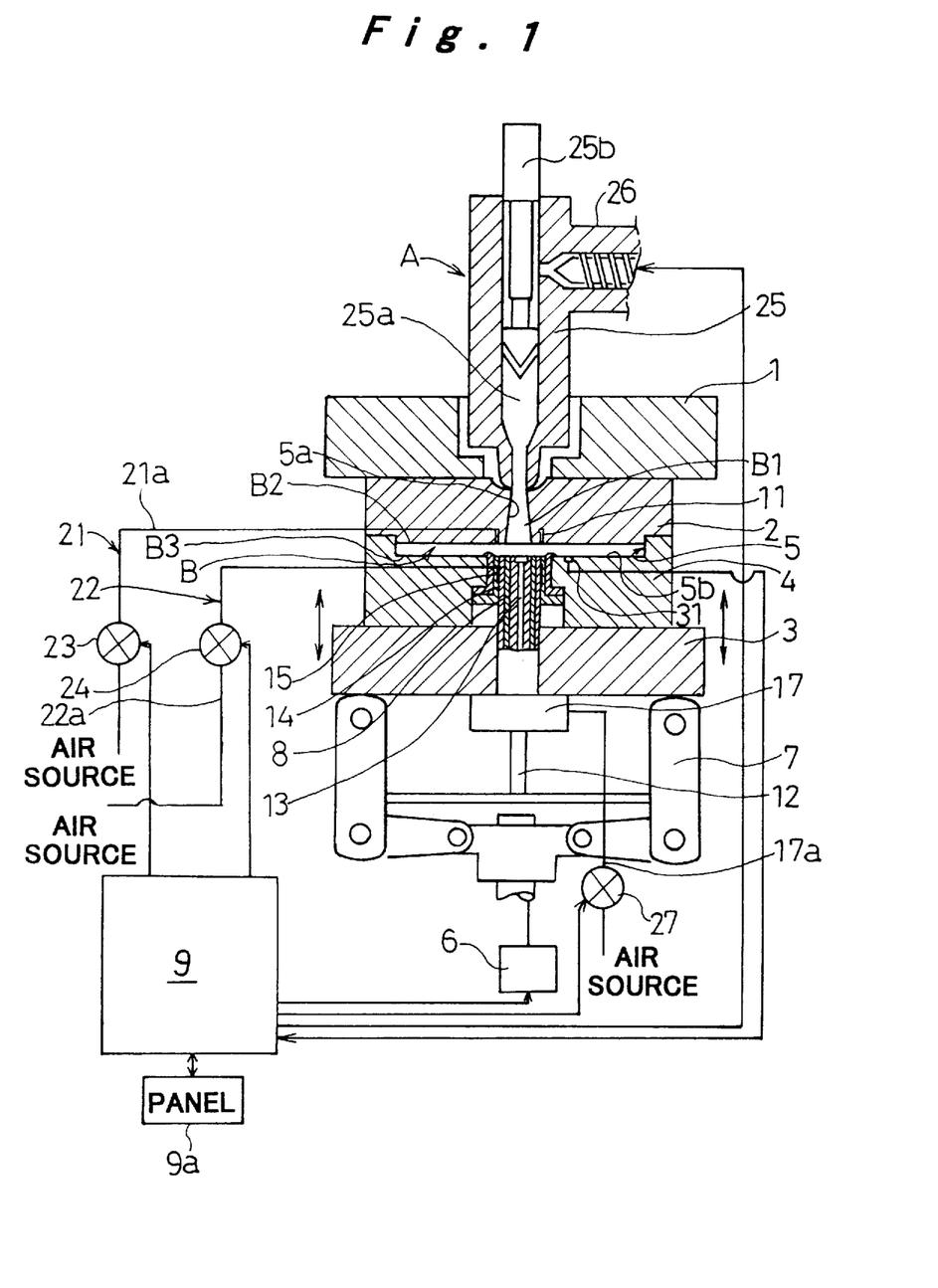
FIG. 1 is a schematic view of an injection molding machine for forming an optical disk substrate.
Figure 2A:
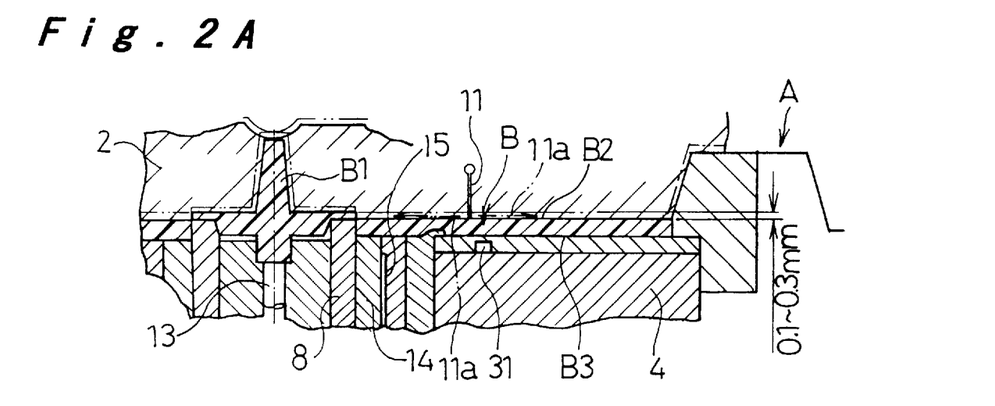
FIGS. 2A–2C are cross-sectional views of the injection molding machine of FIG. 1, respectively showing a state in which the mold separation is started, a state in which an optical disk substrate is being removed from the mold at an early step of the ejecting operation, and a state in which the optical disk substrate and its sprue portion are being ejected for removal.
Figure 2B:
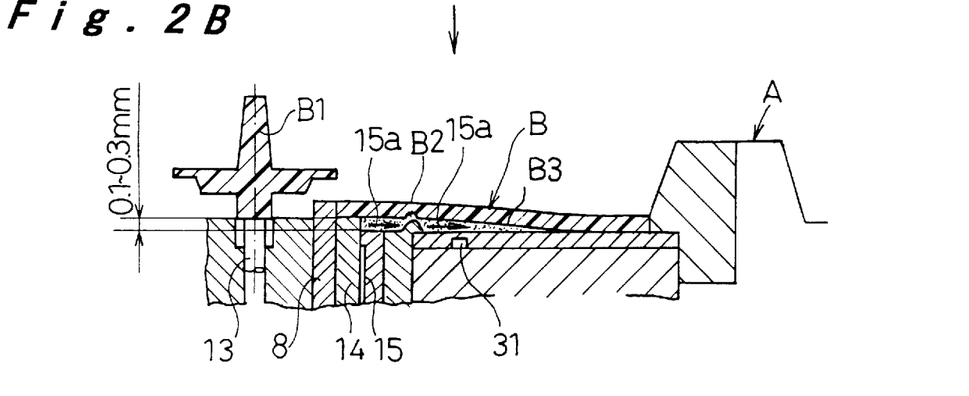
Figure 2C:
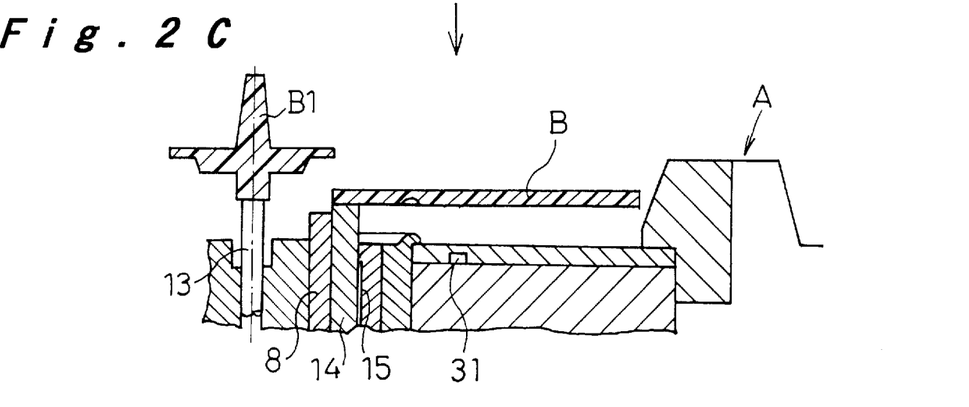

An optical disk substrate B shown in FIGS. 2A–2C is formed using an injection molding machine A shown in FIG. 1. The injection molding machine A includes an upper mold 2 downwardly fixed to a stationary plate 1 at a side where a resin material is injected and a lower mold 4 supported by a movable plate 3 for opening and closing actions as shown in FIG. 1. The resin material is injected into a cavity 5 defined between the two molds 2 and 4 to form a thin component such as an optical disk substrate. The cavity 5 comprises a sprue region 5a, through which the resin material is injected, and a substrate region 5b where the optical disk substrate B is shaped from the resin material injected through the sprue region 5a.

The movable plate 3 is connected by a link 7 to and driven vertically by an actuator 6 for opening and closing the lower mold 4. Various movements of the lower mold 4, including the start, stop, and pause, as well as the operation speed, are controlled with motion signals transmitted from a controller 9, such as a microcomputer, to the actuator 6.

The lower mold 4 is provided with a gate cut punch 8 driven vertically by a hollow cylinder 17 mounted to the movable plate 3. A sprue eject rod 13 and a substrate eject rod 14 are driven by an eject rod 12 fixedly mounted to a base (not shown) in a sequence and at a given ratio of motions in accordance with progression of a mold separating action as shown in FIG. 2. The hollow cylinder 17 is actuated with a solenoid valve 27 which is connected to a conduit 17a of the cylinder 17 and timely controlled by motion signals from the controller 9.

The upper mold 2 is provided with an air feeding means 21 for applying a jet of air from slots 11 to an upper surface B2 of the optical disk substrate B formed in the cavity 5. Similarly, the lower mold 4 is provided with an air feeding means 22 for applying a jet of air from slots 15 to a lower surface B3 of the optical disk substrate B formed in the cavity 5. Each of the air feeding means 21 and 22 has its respective air feeding conduits 21a and 22a communicated to their corresponding slots 11 and 15 provided in the molds 2 and 4. The solenoid valves 23 and 24, respectively mounted to the air feeding conduits 21a and 22a, are controlled by motion signals from the controller 9 to apply and stop the jets of air.

The sprue region 5a, in the upper mold 2, is connected across the stationary plate 1 to an injection cylinder 25. The injection cylinder 25 has an interior space 25a into which a given amount of the resin material in liquid form is supplied from a preplastic heat cylinder 26. The resin material is injected into the cavity 5 by the action of a plunger 25b of the injection cylinder 25. The start and stop actions of the cylinders 25 and 26 and the amount of the resin material to be injected are controlled by motion signals from the controller 9.

For those controlling operations, the controller 9 includes an operation panel 9a for entering data of the operating modes and parameters. Programs for controlling the molding operation may be saved in either an external storage medium or a built-in memory of the controller 9.

The resin material filled in the cavity 5 is cooled down by heat radiation to the molds 2 and 4 and gradually cured from the sides near the molds 2 and 4.

Figure 3A:
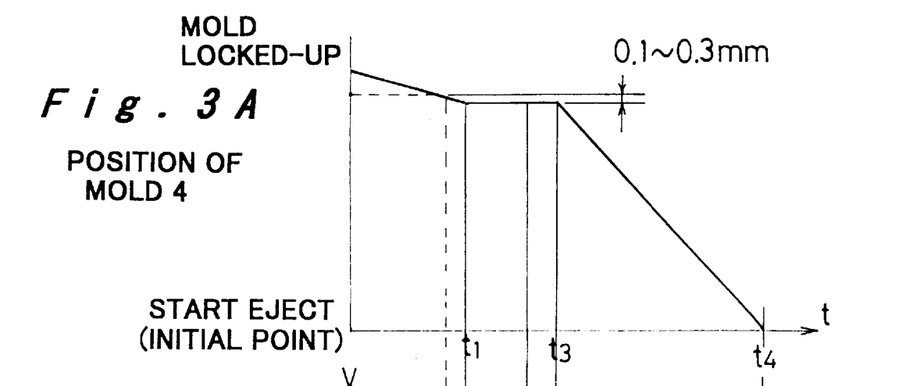
FIG. 3A represents the position of a lower mold at a movable plate side.
Figure 3B:
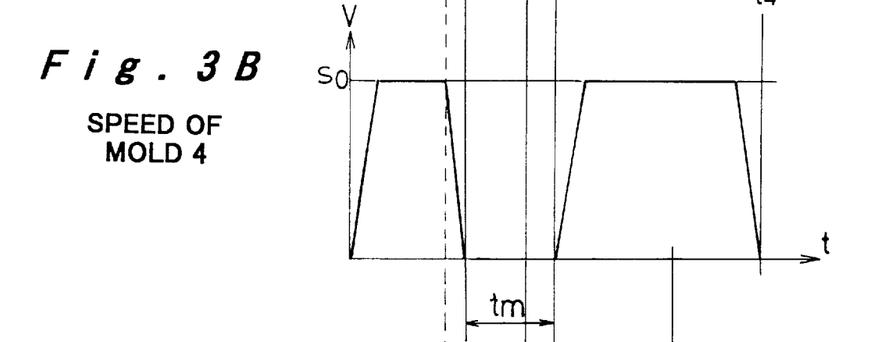
FIG. 3B represents the speed of separating movement of the lower mold.
Figure 3C:
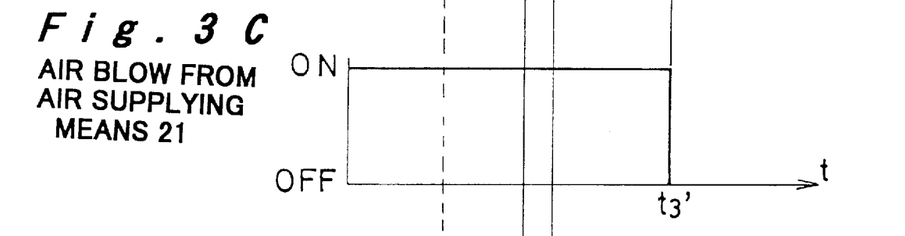
FIG. 3C represents the action of air blowing across an upper mold at a stationary plate side.
Figure 3D:
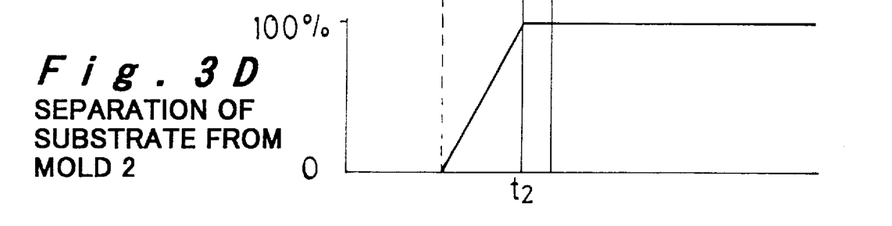
FIG. 3D represents the state of the optical disk substrate being removed from the upper mold at the stationary plate side.

In this cooling process, the gate cut punch 8 is lifted up by action of the hollow cylinder 17 mounted to the movable plate 3 thus separating a sprue portion B1 from the optical disk substrate B formed of the resin material shaped in the cavity 5 between the two molds 2 and 4 as shown in FIGS. 2A–2C. The temperature at a central part of the resin material forming the optical disk substrate B is measured with a thermal sensor 31. The cooling process is continued with the molds remaining closed until the controller 9 judges that the resin material is cooled down to its thermoforming temperature. For example, in case that the resin material is polycarbonate, the molds 2, 4 are kept closed until the temperature reaches about 145° C. which is close to the thermoforming temperature of about 126.5° C. of polycarbonate. If the cooling time required for the resin material is known, it is also possible to preliminarily input the data regarding the cooling time in the controller 9, based on which the molds 2, 4 are kept closed until the resin is cooled down to a certain temperature. After the cooling, the jet of air is applied by the air feeding means 21 to the interface between the upper mold 2 and the upper surface B1 of the optical disk substrate B, as shown in the timing chart of FIG. 3C, while at the same time the movable plate 3 is descended by the link 7 driven by the actuator 6 as shown in FIG. 3A. The molds 2, 4 are opened up to a position within a permissive range of deformation of the optical disk substrate B. A state of the molds 2, 4 slightly separated from each other by a distance of 0.1–0.3 mm is shown in FIG. 2A by a phantom line which, for simplifying the illustration, denotes the upper mold 2 shifted from the lower mold 4. The opening motion is paused at the point t1 shown in FIG. 3A where the lower mold 4 is away from the upper mold by the distance of 0.1–0.3 mm. The separation of the molds 2, 4 is restarted either from the point t2 when the optical disk substrate B is separated from the upper mold 2 by the air jet or the point t3 when the cooling with a flow of air 11a across the upper mold 2 has been sufficiently supplied, as shown in FIG. 3A. Both separating actions of the molds 2, 4 described above are carried out at a high speed S0 as shown in FIG. 3B. The jet of air from the air feeding means 21 is stopped at the point t3' between t3 and t4 as shown in FIG. 3C during the separation of the molds when the molds 2 and 4 are so widely separated from each other that the air jet provides little effect.

A modified example of the embodiment is shown in the timing charts of FIGS. 4A–4D, in which the descending speed of the lower mold 4 is decreased to a low rate S1 (FIG. 4B) from the point t1 to the point t3, and the duration tm therebetween is set to be identical with that of the embodiment described in conjunction with FIGS. 3A–3D.

Although the jet of air is applied across the upper mold 2 on the stationary plate 1 side to the upper surface of the optical disk substrate B during the mold separating action similar to with the prior art arrangement, the separating action in this embodiment is paused before the lower mold 4 reaches a point where the deformation on the optical disk substrate B exceeds the permissive level. In a modified embodiment shown in FIG. 4, the speed of the lower mold 4 is decreased to a slower speed S1 during the time when air is blown on the upper surface B1 of the optical disk substrate B to be removed from the upper mold 2 before the lower mold 4 reaches a point where the amount of deformation on the optical disk substrate B exceeds the permissive level. The application of the air jet is more intensive but shorter in duration hence allowing the optical disk substrate B to be removed from the upper mold 2 quickly and to be cooled down to the thermoforming temperature. The deformation of the optical disk substrate B is thereby restricted by controlling the amount of separation of the lower mold 4 from the upper mold 2. After the resin material is cooled down, the molds 2, 4 are separated at the high speed S0. Accordingly, the time for removing the optical disk substrate B from the upper mold 2 at the stationary plate 1 side and cooling down the same in the cycle of the molding operation is effectively minimized without presenting problems of deflection or bending of the optical disk substrate B.

Figure 4A:
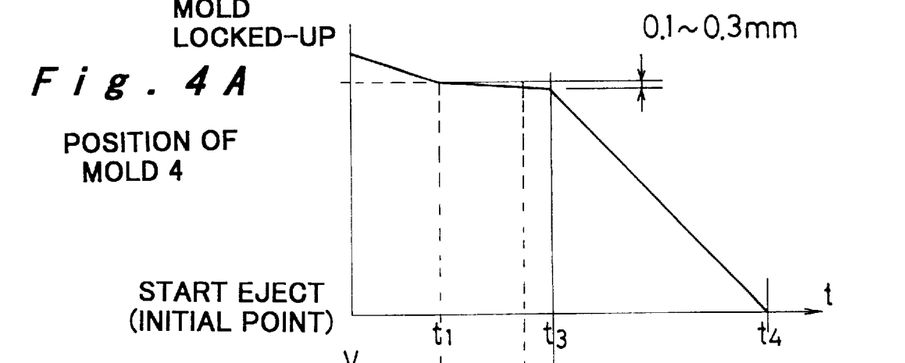
FIG. 4A represents the position of a lower mold at a movable plate side.
Figure 4B:
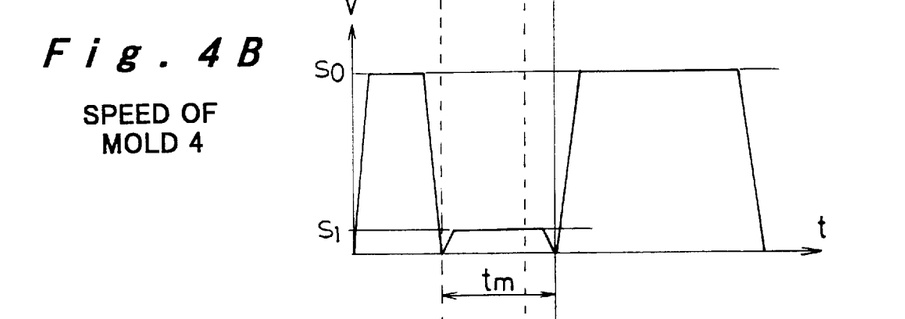
FIG. 4B represents the speed of separating movement of the lower mold.
Figure 4C:
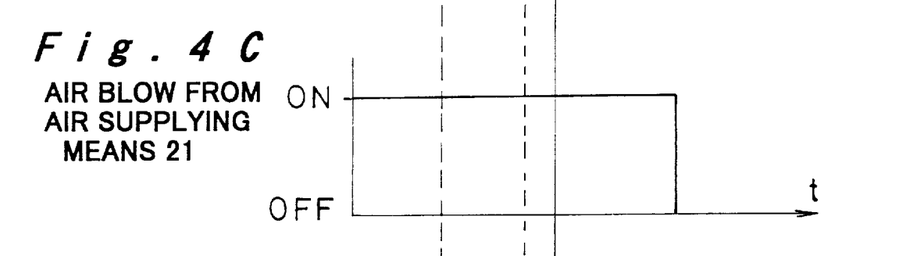
FIG. 4C represents the action of air blowing across an upper mold at a stationary plate side.
Figure 4D:
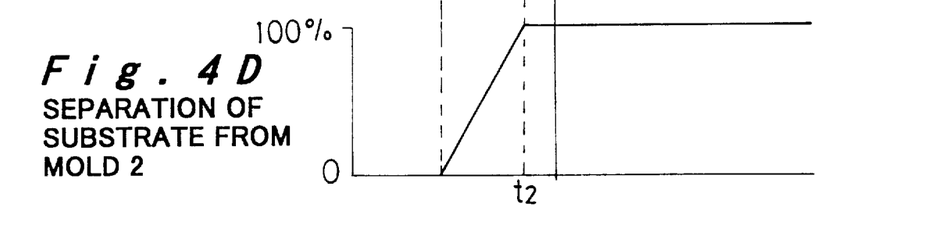
FIG. 4D represents the state of the optical disk substrate being removed from the upper mold at the stationary plate side.

After the lower mold 4 has reached the point t4, shown in FIGS. 3A and 4A, by further descending the movable plate 3 to start the ejecting operation, the lower mold 4 is further separated from the upper mold 2 so as to cause the sprue eject rod 13 to be pushed by the eject rod 12 fixedly mounted to the base (not shown), for ejecting out the sprue portion B1 as shown in FIG. 2B. When the separation of the molds further proceeds to a point t5, shown in the time chart of FIG. 5A, where the sprue portion B1 is ejected out by a distance of 4 mm, the substrate eject rod 14 is lifted up about 0.1 mm to 0.3 mm, as a result of which the central part of the optical disk substrate B is removed from the lower mold 4 by 0.1 to 0.3 mm as shown in FIG. 2B.

Figure 5A:
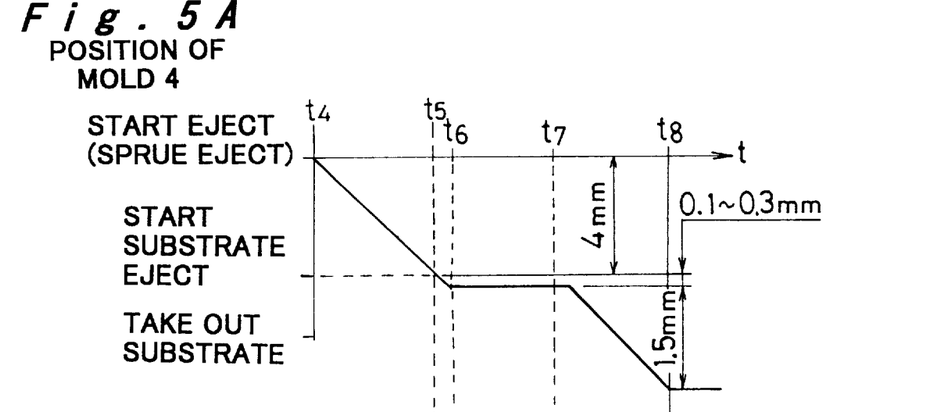
FIG. 5A represents the position of a lower mold at a movable plate side.
Figure 5B:
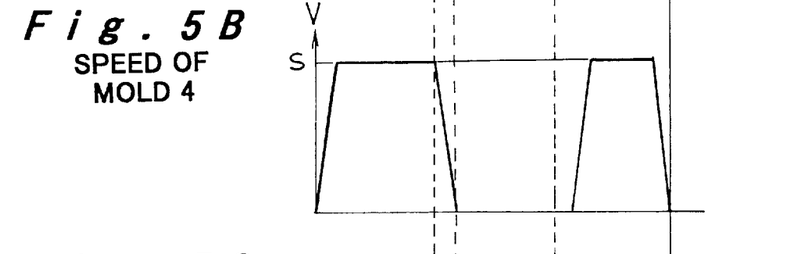
FIG. 5B represents the speed of separating movement of the lower mold.
Figure 5C:
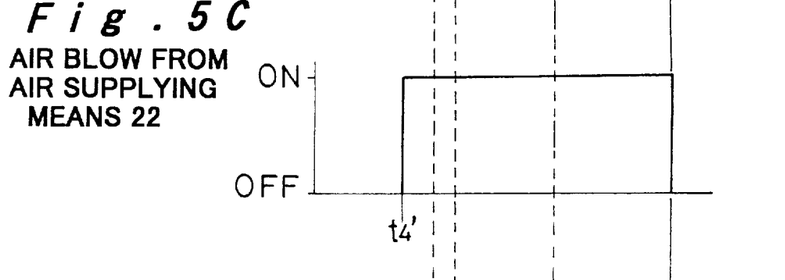
FIG. 5C represents the action of air blowing across the lower mold at the movable plate side.
Figure 5D:
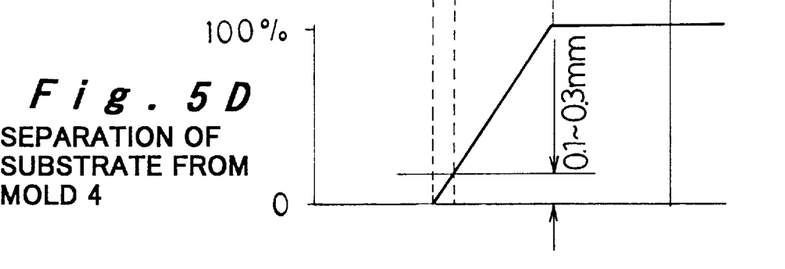
FIG. 5D represents the state of the optical disk substrate being removed from the lower mold at the movable plate side.
Figure 6A:
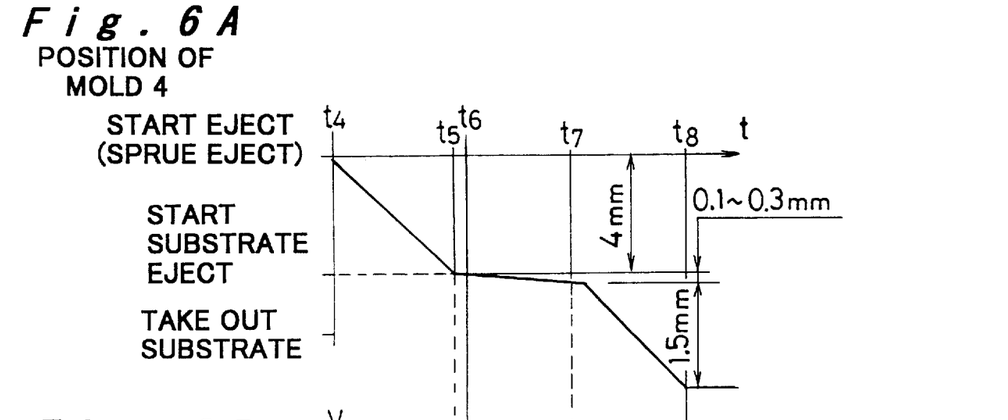
FIG. 6A represents the position of a lower mold at a movable plate side.
Figure 6B:
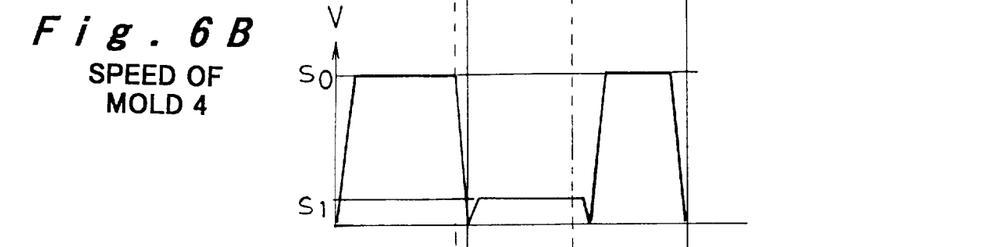
FIG. 6B represents the speed of separating movement of the lower mold.
Figure 6C:
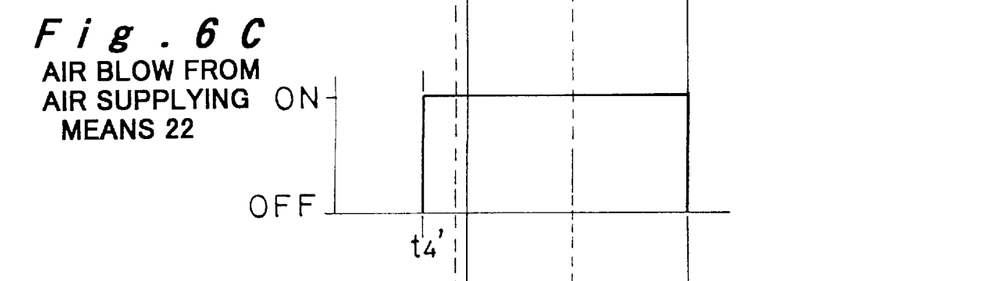
FIG. 6C represents the action of air blowing across the lower mold at the movable plate side.
Figure 6D:
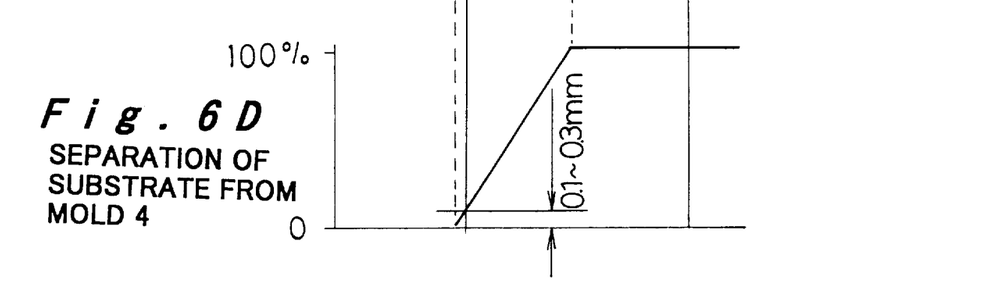
FIG. 6D represents the state of the optical disk substrate being removed from the lower mold at the movable plate side.

The separating operation of the molds is paused at a point t6 where the central part of the optical disk substrate B is slightly removed from the lower mold 4. Meanwhile, the air supplying means 22 starts to blow a jet of air across the slots 15 in the lower mold 4 to the lower surface B3 of the optical disk substrate B at a proper point t4' between the point t4 where the ejecting operation is started and the point t5 where the sprue eject rod 13 is projected out as shown in FIGS. 5A and 5C. The point t4' is preferably set just before the point t5, for achieving optimum effects of the air jet. The separation of the molds is restarted at a point t7 shown in FIG. 5A where the lower surface B3 of the optical disk substrate B has been completely removed from the lower mold 4 by the blown air 15a. Then, the substrate eject rod 14 is further lifted up about 1.5 mm after the point t7, which causes the inner periphery of the sprue portion B1 to be lifted up higher than the gate cut punch 8 as shown in FIG. 2C. The sprue portion B1 is continued to be thrust up by the sprue eject rod 13 to be further higher than the optical disk substrate B for easy removal therefrom, and the mold separating operation is terminated. The optical disk substrate B and its sprue portion B1 are then automatically taken out from the injection molding machine. Meanwhile, the air jet from the air supplying means 22 is stopped and the movable table 3 is returned to its eject start position to end the ejecting operation.

Alternatively, as shown in timing charts of FIGS. 6A–6D, the speed of the mold separating operation may be decreased to a lower speed S1 either from the point t5 where the substrate eject rod 14 is started to be thrust up or the point t6 where the mold opening operation is temporarily paused to the point t7 where the central part of the optical disk substrate B is slightly (0.1 mm–0.3 mm) removed from the lower mold 4, while blowing air from the slots in the lower mold 4 to entirely remove the lower surface B3 of the optical disk substrate B from the lower mold 4 before reaching the point t7.

In this embodiment and its modification described above, during the ejecting process of the optical disk substrate B after the mold separating operation, a jet of air is blown to the interface between the lower surface and the optical disk substrate B from the lower mold 4 simultaneously with the start of the ejecting operation, similar to the prior art arrangement. In this embodiment, however, the ejecting action is temporarily paused before the deformation at the center of the optical disk substrate B being thrust up exceeds a permissible level. Alternatively, in the modified embodiment, the speed of ejecting action is reduced to a lower speed S1 before the deformation at the central part of the optical disk substrate B exceeds a permissive level, so as to entirely remove the lower surface B3 of the optical disk substrate B from the lower mold 4 by the air jet.

By this arrangement, the deformation of the optical disk substrate B is restricted to within the permissible range by controlling the amount of thrust on the optical disk substrate B, and the substrate B is more quickly removed from the lower mold 4 by an intensive jet of air for a shorter time. The air jet also helps to further cool down the optical disk substrate B to prevent unwanted deformation caused by heat. After the removal of the substrate, the ejecting operation is continued at a high speed S0, thus reducing the time required for the removal of the substrate B from the lower mold 4 without presenting problems of deflection or bending of the optical disk substrate B.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A method of forming a disk-shaped component with an injection molding machine, comprising the steps of:

injecting a resin material into a cavity defined by an upper mold disposed at a stationary plate and a lower mold disposed at a movable plate to mold the disk-shaped component;

blowing a jet of air into an interface between a formed surface of the disk-shaped component and the upper mold while simultaneously opening the upper and lower molds;

pausing the opening of the upper and lower molds temporarily at a position prior to which an amount of deformation of the disk-shaped component exceeds a permissible level and allowing the jet of air to continue separation of the disk-shaped component from the upper mold; and restarting the opening of the upper and lower molds after the formed surface of the disk-shaped component is completely removed from the upper mold.

2. A method of forming a disk-shaped component with an injection molding machine, comprising the steps of:

injecting a resin material into a cavity defined by an upper mold disposed at a stationary plate and a lower mold disposed at a movable plate to mold the disk-shaped component;

blowing a jet of air into an interface between a formed surface of the disk-shaped component and the upper mold;

starting opening of the upper mold and the lower mold apart from one another at a first speed and continuing opening of the upper and lower mold until the upper mold and the lower mold are spaced apart a predetermined distance which is less than a distance at which deformation of the disk-shaped component exceeds a permissible limit;

reducing a speed of opening the upper mold and the lower mold to a second speed, which is less than the first speed, when the upper mold and the lower mold are spaced apart the predetermined distance;

descending the lower mold at the second speed until the disk-shaped component is completely separated from the upper mold;

returning the speed of descending the lower mold to the first speed of opening when the disk-shaped component is completely separated from the upper mold.

3. A method of forming a disk-shaped component with an injection molding machine, comprising the steps of:

injecting a resin material into a cavity defined by an upper mold disposed at a stationary plate and a lower mold disposed at a movable plate to mold the disk-shaped component;

opening the upper and the lower molds apart from each other to release the disk-shaped component from the upper mold;

blowing a jet of air into an interface between a formed surface of the disk-shaped component and the lower mold while further opening the upper mold apart from the lower mold for releasing the disk-shaped component from the lower mold by engagement of a central part of the disk-shaped component with an ejecting member;

pausing the opening of the upper and lower molds temporarily at a position before an amount of deformation of the disk-shaped component due to the engagement at the central part thereof exceeds a permissible level and allowing the blowing of the jet of air to completely separate the formed surface of the disk-shaped component from the lower mold; and restarting opening of the upper and lower molds after the formed surface of the disk-shaped component is completely separated from the lower mold by the blowing of the jet of air; and ejecting the disk-shaped component to a position for removal.

4. A method of forming a disk-shaped component with an injection molding machine, comprising the steps of:

injecting a resin material into a cavity defined by an upper mold disposed at a stationary plate and a lower mold disposed at a movable plate to mold the disk-shaped component;

opening the upper and the lower molds apart from each other to release the disk-shaped component from the upper mold;

blowing a jet of air into an interface between a formed surface of the disk-shaped component and the lower molds;

starting further opening of the upper mold and the lower mold apart from each other at a first speed for releasing a lower surface of the disk-shaped component from the lower mold by engagement of a central part of the disk-shaped component with an ejecting member until the upper mold and the lower mold are spaced apart a predetermined distance which is less than a distance at which deformation of the disk-shaped component at the central part exceeds a permissible limit;

reducing the speed of opening the upper mold apart from the lower mold to a second speed, which is less than the first speed, when the lower mold and the upper mold are spaced apart the predetermined distance such that deformation of the disk-shaped component does not exceed the permissible limit;

descending the lower mold at the second speed until the lower surface of the disk-shaped component is completely released from the lower mold;

returning the speed of opening the upper mold apart from the lower mold to the first speed when the disk-shaped component is completely released from the lower mold.

5. A method of forming a disk-shaped component with an injection molding machine, comprising the steps of:

injecting a resin material into a cavity defined by an first mold and a second mold to mold the disk-shaped component;

blowing a jet of air into an interface between a formed surface of the disk-shaped component and the first mold and simultaneously separating the first and second molds;

pausing the separating of the first and second molds at a position prior to which an amount of deformation of the disk-shaped component exceeds a permissible level and prior to complete separation of the formed surface of the disk-shaped component from the first mold;

allowing the jet of air to continue separation of the formed surface of the disk-shaped component from the first mold; and restarting the opening of the first and second molds after the formed surface of the disk-shaped component is completely removed from the first mold.

6. A method of forming a disk-shaped component with an injection molding machine, comprising the steps of:

injecting a resin material into a cavity defined by an first mold and a second mold to mold the disk-shaped component;

opening the first and the second molds apart from each other to release the disk-shaped component from the first mold;

blowing a jet of air into an interface between a formed surface of the disk-shaped component and the second mold while further moving the second mold relative to an ejecting member for releasing the disk-shaped component from the second mold by engagement of a central part of the disk-shaped component with the ejecting member;

pausing the movement of the second mold temporarily at a position before an amount of deformation of the disk-shaped component due to the engagement at the central part thereof exceeds a permissible level and allowing the blowing of the jet of air to completely separate the formed surface of the disk-shaped component from the second mold; and restarting moving of the second mold, after the formed surface of the disk-shaped component is completely separated from the second mold by the blowing of the jet of air, to move the disk-shaped component to a position for removal.

7. A method of forming a disk-shaped component with an injection molding machine, comprising the steps of:

injecting a resin material into a cavity defined by an first mold and a second mold to mold the disk-shaped component;

blowing a jet of air into an interface between a formed surface of the disk-shaped component and the first mold;

starting opening of the first mold and the second mold apart from each other at a first speed and continuing opening of the first and second molds until the first mold and the second mold are spaced apart a predetermined distance which is less than a distance at which deformation of the disk-shaped component by the opening at the first speed exceeds a permissible limit;

reducing a speed of opening the first mold and the second mold to a second speed, which is less than the first speed, when the first mold and the second mold are spaced apart the predetermined distance such that deformation of the disk-shaped component does not exceed the permissible limit;

opening the second mold apart from the first mold at the second speed until the disk-shaped component is completely separated from the first mold; and returning the speed of opening the second mold apart from the first mold to the first speed when the disk-shaped component is completely separated from the first mold to position the disk-shaped component for removal.

8. A method of forming a disk-shaped component with an injection molding machine, comprising the steps of:

injecting a resin material into a cavity defined by an first mold and a second mold to mold the disk-shaped component;

opening the first and the second molds apart from each other to release the disk-shaped component from the first mold;

blowing a jet of air into an interface between a formed surface of the disk-shaped component and the second mold;

moving the second mold relative to an ejecting member at a first rate of speed for releasing the formed surface of the disk-shaped component from the second mold by engagement of a central part of the disk-shaped component with the ejecting member until the ejecting member and the second mold are spaced apart a predetermined distance which is less than a distance at which deformation of the disk-shaped component at the central part by the moving at the first speed exceeds a permissible limit;

reducing the speed of moving the second mold to a second speed, which is less than the first speed, when the second mold and the ejecting member are spaced apart the predetermined distance such that deformation of the disk-shaped component does not exceed the permissible limit;

moving the second mold at the second speed until the second formed surface of the disk-shaped component is completely released from the second mold; and returning the speed of moving the second mold to the first speed when the disk-shaped component is completely released from the second mold to position the disk-shaped component for removal.

* * * * *